Aug. 30, 1960    J. W. LANNERT    2,950,868
IMPELLING MEANS FOR FOOD WASTE DISPOSER
Filed July 2, 1957    2 Sheets-Sheet 1
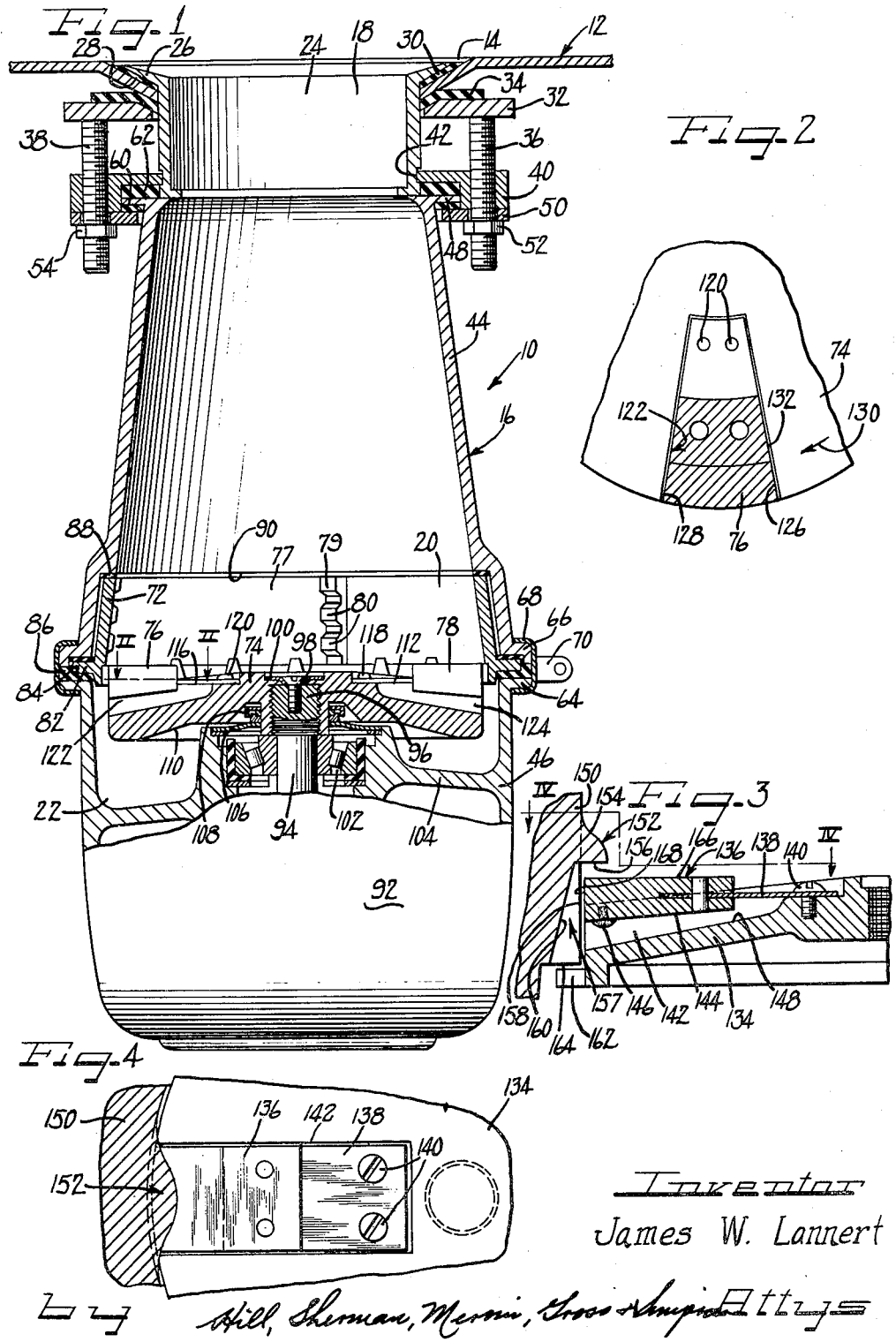
Inventor
James W. Lannert

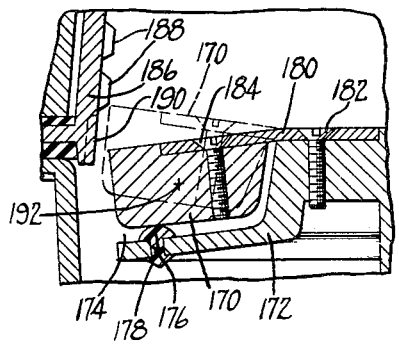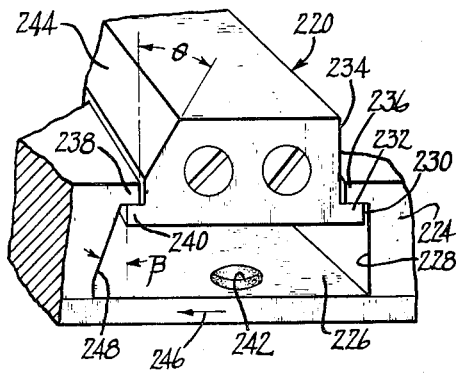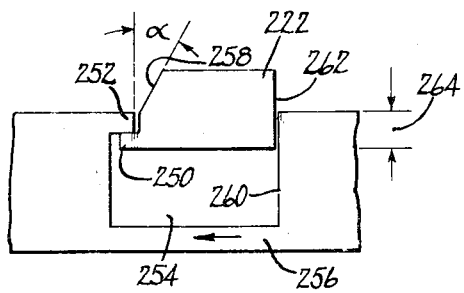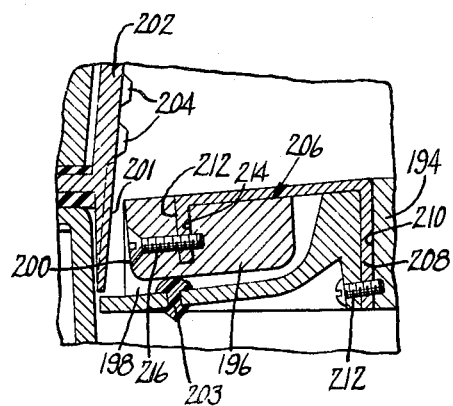

United States Patent Office 2,950,868
Patented Aug. 30, 1960

2,950,868

IMPELLING MEANS FOR FOOD WASTE DISPOSER

James W. Lannert, St. Joseph, Mich., assignor to Whirlpool Corporation, St. Joseph, Mich., a corporation of Delaware Filed July 2, 1957, Ser. No. 669,521

18 Claims. (Cl. 241—46)

The present invention relates to improvements in food waste grinders and disposers and particularly to domestic types which are connected to the drain of a kitchen sink for grinding kitchen waste and scraps, and washing the ground waste down the drain with water from the sink.

A general feature of the invention is to provide a food waste disposer and grinder which has an improved grinding action and is more capable of grinding wastes of the type which are encountered in household refuse. Improved grinding will increase the speed of operation of the grinder, increase the variety and types of waste which can be handled, reduced stoppage and clogging of the drain, and generally enhance the overall operation and wearing life of the machine.

Another feature of the invention provides an improved grinder which greatly reduces the possibility of jamming or stalling with load. This increases the capability of the machine to handle various types of waste and makes the machine much better adapted for household use. Stalling of the grinder will cause poor grinding, inconvenience to the housewife, and may damage the machine.

It is an object of the present invention to provide an improved grinding mechanism for use in a food waste disposer and grinder which avoids disadvantages heretofore present.

Another object of the invention is to provide an improved food waste disposer which is capable of grinding materials of varying particle size and of various hardnesses without appreciably slowing or stalling the grinder motor.

Another object of the invention is to provide a food waste disposer wherein the grinder noise is reduced.

A still further object of the invention is to provide an improved food waste grinder provided with a plurality of cutting zones for performing an improved grinding action.

A further object of the invention is to provide a food waste disposer and grinder wherein the grinding surfaces will automatically be reduced in size in such a way as to temporarily reduce the effectiveness of the grinder with increased resistance to grinding action, without an accompanying decrease in the speed of the grinder.

A still further object of the invention is to provide a food waste grinder having stationary grinding surfaces and a cooperating moving grinding or cutting surface which can vary its relative position when it encounters rigid obstructions to thereby avoid damage to the grinder and prevent the grinder from slowing down.

A further object of the invention is to provide a food waste grinder having a rotor carrying a movable cutter therein with an improved mounting arrangement to carry the cutter on the rotor.

Other objects and advantages will become more apparent with the teaching of the principles of the invention in the disclosure of the preferred embodiments thereof in the specification, claims and drawings, in which:

Figure 1 is a view, partially in vertical section, taken through the center of a food waste disposer and grinder embodying the features of the present invention;

Figure 2 is a horizontal sectional view taken along line II—II of Figure 1;

Figure 3 is an enlarged vertical sectional view taken through the grinder rotor illustrating one form of grinding arrangement;

Figure 4 is a horizontal sectional view taken substantially along line IV—IV of Figure 3;

Figure 5 is an enlarged vertical sectional view taken through the grinder rotor illustrating another form of the invention;

Figure 6 is an enlarged vertical sectional view, similar to Figure 5, but illustrating still another form of the grinder;

Figure 7 is a perspective view taken from the side of the grinder rotor and illustrating another form of the cutter and rotor; and Figure 8 is an elevational view from the side of the rotor shown somewhat diagrammatically to illustrate still another form of the cutter and rotor.

As illustrated in Figure 1, a food waste disposer 10 is suspended beneath a sink 12, mounted in the drain opening 14 thereof.

The waste disposer 10 is provided with a casing or housing 16 with an inlet 18 for receiving large waste particles. The waste particles pass downwardly into a grinding zone 20, and after being ground, drop down into a discharge channel 22 which leads to a discharge opening, not shown. The discharge opening is connected to the drain which leads to the sewer and the water flowing down from the sink through the disposer housing 16 washes the ground waste particles down through the drain.

For supporting the disposer housing 16, an upper supporting ring 24 is provided having an annular flange 26 which rests on the downwardly sloping shoulder 28 surrounding the opening of the sink 12. A gasket 30 is located under the flange 26 to prevent leakage of water from the sink. The flange is drawn tight against the gasket and against the shoulder 28 by a clamping ring 32, which pushes upwardly against the shoulder portion 28 and has a gasket 34 between the ring 32 and shoulder portion 28.

The clamping ring is forced upwardly to secure the disposer housing 16 in place by circumferentially spaced bolts 36 and 38. These bolts are threaded into a bolt supporting ring 40, which is secured to the housing supporting ring 24 along its inner edge 42. These bolts 36 and 38 are threaded up through the ring 40 to push the clamping ring 32 firmly in place and hold the disposer housing rigidly in place beneath the sink.

The housing 16 has an upper portion 44 and a lower portion 46. The upper portion has an annularly outwardly extending flange 48 at its upper end which supports the housing 16. For this purpose, a housing clamping ring 50 is provided with circumferentially spaced openings to slide over the ends of the bolts 36 and 38. Nuts 52 and 54 are threaded over the ends of the bolts which project downwardly through holes in the clamping ring 50 and draw the clamping ring into place to pull up on the flange 48. Gaskets 60 and 62 are provided below and above the flange 48 to join the housing section 44 to the ring 24 in a fluid-tight manner.

To join the lower section 46 of the housing to the upper section 44, an outwardly extending annular flange 64 is provided at the upper end of the lower housing 46 and an outwardly extending annular flange 66 is provided at the lower end of the upper section 44 of the housing. The two sections are held together by a clamping ring 68 which is U-shaped in cross section so that its edges will extend over flanges 64 and 66. The ring 68 is split at one place and provided with ears such as 70 at each side of the split so that a bolt may draw the ears together to clamp the ring 68 tightly over the housing sections.

In clamping the housing sections together, a stationary shredder ring 72 is held in place. The shredder ring 72 forms one of the grinding elements in the grinding zone 20 and the other grinding member includes a flywheel or rotor 74 carrying rotatable cutters 76 and 78.

The shredder ring 72 may take various forms, but is shown as generally annular in shape, being slightly conical with walls 77 tapering inwardly toward the upper end. Spaced along the walls are vertical rows 79 of individual shredding teeth 80.

The lower end of the shredder ring 72 has an annular outwardly extending flange 82 which is held in a notch 84 in the annular resilient gasket ring 86, which is located between the flanges 64 and 66 of the lower and upper sections of the housing. The shredder ring flange 82 thus resiliently supports the shredder ring by projecting into the gasket 86. Another gasket 88 is provided at the upper end of the shredder ring and seats against a downwardly facing shoulder 90 provided within the upper section 44 of the housing 16. The shredder ring 72 is thus held stationary within the housing.

The lower section 46 of the housing supports a motor within the housing wall 92 which is provided for driving the flywheel or rotor 74. The motor has a vertically extending drive shaft 94 which is threaded at its upper end 96 into an internally threaded opening in the axial center of the flywheel 74. A holding screw 98 carrying a fluid-sealing washer 100 threads downwardly into the upper end of the motor drive shaft 94 to lock the flywheel 74 onto the end of the drive shaft. The drive shaft is supported in a bearing 102 which is supported by a wall 104 inwardly from the side of the lower section 46 of the housing and defining one end of the channel 22 through which the ground waste material and flushing water flow when leaving the disposer.

A stationary sealing member 106 is provided above the bearing to coact with a movable sealing member 108 to prevent fluid from escaping from the channel 22 to get into the bearing 102 or into the chamber enclosing the motor. The flywheel has a concave lower surface 110 so that moisture will sling off of the rotating flywheel or rotor to prevent it from coming in contact with the bearing 102 and getting down into the compartment housing the motor.

The flywheel carries the cutters 76 and 78 by supporting them on spring leaves 112 and 116 which are secured to the flywheel by bolts 118 and 120. The cutters 76 and 78 are located in radially extending slots 122 and 124 in the flywheel. The slots are sufficiently deep to permit vertical movement of the cutters 76 and 78. Thus, when a cutter engages a waste particle which is unusually hard or provides an unusually large resistance to continued rotation of the cutter, it will deflect permitting the flywheel to continue to rotate. This prevents accidental stalling of the rotor due to unusually hard particles such as stones, hard bones and the like. This will also prevent the flywheel from slowing down when unusually tough material is encountered. Such slowing down will have the result of decreasing the cutting power of the cutters and, if avoided, will increase the capacity and cutting ability of the disposer.

As illustrated in Figure 2, the slot 122 which carries the cutter 76 has radially extending sides 126 and 128. The flywheel 74 rotates in the direction indicated by the arrow 130 and thus, the radial side 126 of the slot will be driving against side 132, of the cutter 76. Radial sides such as 126 and 128 for the slots have been found to provide the best characteristics for preventing jamming of the cutter 76 within the slot.

In the form shown in Figures 3 and 4, the flywheel 134 is provided with a cutter 136. The cutter is carried on a leaf spring 138 secured to the rotor by a bolt 140.

The flywheel 134 has a radially extending slot 142 in which the cutter 136 moves in an axial direction. The cutter 136 carries on its lower surface 144 a rubber stop 146 which will strike the floor 148 of the slot when the cutter 136 is forced downwardly to its lowermost position. This movement can be very violent at high speeds of rotation of the rotor and would become noisy except for the provision of the rubber stop 146.

A shredding ring 150 is provided encircling the flywheel and having grinding elements thereon for pulverizing the waste material as it passes downwardly between the shredding ring 150 and the cutter 136.

The first grinding means provided is a plurality of primary shredder teeth 152 which are in the form of inwardly projecting horizontal teeth with a rounded upper surface 154 and a flat lower surface 156. A plurality of these primary shredder teeth 152 may be provided along the inner circumference of the shredder ring 150.

The waste material next passes downwardly to be ground by secondary shredder teeth 157 which are radially opposite the slot 142 in the flywheel 134. A plurality of these shredder teeth 157 are supported on the shredder ring 150 and are arranged around the flywheel. The secondary shredder teeth 157 have a vertical inner face and project outwardly from the shredder ring 150 with a rear edge 160 tapered radially outwardly in a downward direction so that the teeth have a substantially triangular shape in profile, as shown in Figure 3. The outer surface 168 of the cutter and the inner vertical face of the shredder teeth 157 define an axially extending grinding space therebetween.

A third set of shredder teeth 162 are provided carried on the flywheel and projecting outwardly therefrom. The teeth are spaced circumferentially and coact with a lower horizontal surface 164 of the secondary shredder teeth 157.

Thus, the waste material passes through three shredding zones, the first being provided between the upper surface 166 of the cutter 136 and the lower surface 156 of the primary pulverizer teeth 152.

The second shredding or grinding zone is provided between the leading edge of the outer surface 168 of the cutter 136 and the outer edge 158 of the secondary shredder teeth 157.

The third grinding zone is provided between the third set of shredder teeth 162 and the lower surfaces 164 of the secondary shredder teeth 157.

It will be noted that as the cutters 136 move into their slots to have their effective cutting faces reduced in area, the distance between the secondary shredder teeth 157 and the cutter remains substantially the same so that effective grinding continues.

In the form illustrated in Figure 5, a cutter or cutting lug 170 is carried on a flywheel 172. The flywheel 172 is provided with a radially extending slot 174 into which the cutter 170 can recess. A rubber stop 176 is held in a hole 178 at the base of the slot 176, for preventing noise of operation when the cutter 170 moves violently into the bottom of the slot 174.

The cutter is carried on a spring leaf 180. The inner end of the spring leaf is secured to the flywheel 172 by a screw 182. The cutter 170 is connected to the spring leaf by a screw 184. The cutter coacts with a shredder ring 186 which carries upper shredder teeth 188 and additional lower shredder teeth 190.

In the form shown in Figure 5, the spring 180 is formed so that when at rest, the cutter 170 will be urged into the bottom of the slot 174. Only when the flywheel 172 is rotating at high speeds, so that centrifugal force will urge the cutter 170 outwardly, will the cutter move upwardly into the dotted line position of the cutter 170. The center of gravity 192 of the cutter 170 is beneath the spring 180 so that centrifugal force from the cutter will provide a force couple and the cutter will move upwardly on the spring 180 into its cutting position. The upward force on the cutter is dependent on the speed of rotation, and thus when the rotor slows down because of increased resistance, the spring 180 will automatically draw the cutter down into the slot reducing its effective cutting surface.

The cutter will, of course, be resilient in this operative dotted line position so that unusual resistance to its movement will force the cutter down away from a hard object or particle.

In the form shown in Figure 6, a rotor 194 carries the cutter or cutting lug 196. The flywheel is provided with a slot 198 for supporting and driving the cutter 196, and in this instance the radially facing outward end of the slot is open. This permits an end 200 of the cutter to coact with teeth 201 on the shredder ring 202 for grinding waste material. The base of the slot has a rubber noise-reducing stop 203. As the flywheel or rotor 194 gains speed, centrifugal force will move the cutter 196 up into operating position wherein it will coact with teeth 204 on the shredder ring 202.

In the form shown in Figure 6, a supporting spring 206 of a different form is provided. The spring is substantially U-shaped and has an inner lug 208 which extends down into a slot 210 in the flywheel for providing improved support for the cutter. A slotted bolt 212 holds the inner end 208 of the spring in the slot 210. An outer end 212 of the spring 206 projects downwardly into a slot 214 in the cutter. A bolt 216 holds the spring in the slot. In this arrangement, the spring 206 is so shaped to hold the cutter down into the slot 198 when the flywheel 194 is not rotating or rotating at a slow speed. As the speed of the flywheel increases, centrifugal force will move the cutter 196 upwardly out of the slot into cutting position.

In the arrangements shown in Figures 5 and 6, the cutters 170 and 196 will move upwardly out of the slot in proportion to the speed of their supporting flywheels 172 and 174. Thus, as the flywheels slow down due to resistance to cutting, the cutters will recede into their slots, thus reducing the area of cutting face exposed. This will automatically reduce the amount of cutting surface provided when a heavy load is encountered, thus insuring that the grinder will not become jammed and will not become stalled.

In the forms shown in Figures 7 and 8, the cutters 220 and 222 have an angled leading cutting face and have means provided to limit the movement of the cutter out of the slot.

In Figure 7, a flywheel 224 is provided with a radially extending slot 226. The cutter 220 is mounted on the flywheel 224 to move in the slot by suitable means such as being mounted by any of the cutter mounts shown for the cutters of Figures 1 to 6. The slot has a radial driving face or surface 228 which engages a driven surface 230 on the cutter 220. The driven surface 230 is formed on a stop flange 232 projecting rearwardly from the lower edge of the rear surface 234 of the cutter. The slot 226 is provided with a coacting overhanging lip or flange 236 at its upper end to coact with the flange 232 to limit the upward movement of the cutter. At the other side of the slot, an overhanging flange 238 is provided to coact with another flange 240 at the base of the cutter. These flanges 238 and 240 also limit the movement of the cutter outwardly of the slot 226.

The floor of the slot is provided with a rubber or resilient stop 242 which greatly reduces the noise when the cutter 220 is forced into the bottom of the slot.

The leading radial edge of the cutter 220 is beveled to provide a rearwardly inclined surface 244. The angle or inclination of this surface is shown at $\theta$. The value of $\theta$ may be determined experimentally but should not be less than zero, i.e., the surface 224 should have a minimum inclination wherein it is parallel to the inner surface of the flange 238. The cutter controlling surface 244 is a surface lying in a radial plane tilted rearwardly with respect to the direction of rotation about a radial line. In operation, the flywheel rotates in the direction indicated by the arrow 246. The inclined leading surface 244 upon striking waste material will exert a downward component of force on the cutter 220. This will be resisted by a vertical component of force due to centrifugal force. In normal operation, the cutter will operate in the position shown in Figure 7, but upon encountering an exceedingly heavy load, the cutter will move downwardly into the slot a distance determined by the load. This movement into the slot is due to the individual and cooperative effects of a decreased upwardly acting vertical centrifugal force on the cutter and an increased downwardly acting vertical force due to the resistance of the waste material against the slanting leading surface 244. As the resistance of the waste material on the surface 244 increases, the vertical force will increase urging the cutting lug 220 down into the slot 226. This will decrease the cutting surface which is exposed above the slot reducing the load on the flywheel. This will permit the flywheel to either regain or maintain its top speed. The cutting lug 220 will again move upwardly to the position shown in Figure 7 as the resistance from the waste material is reduced due to the grinding action.

The leading surface of side 248 of the slot 226 is also angled forwardly in a downward direction. This angle, $\beta$, will eliminate any chips from jamming. As the cutting lug 220 moves down, chip clearance below the stop flange 238 is increased and chips will flush away. The stop flanges 238 and 236 could be omitted as well as the flanges 232 and 240.

As shown in Figure 8, a cutting lug 222 is provided with only one stop flange 250 which coacts with a stop flange 252 projecting from the leading side of a slot 254 in a flywheel 256. The lug is supported for movement in the slot by suitable means such as by mounts shown for any of the cutters of Figures 1 to 6. The cutting lug 222 is again provided with a beveled leading edge 258 which is beveled at an angle $\alpha$.

The stop flanges 250 and 252 will determine the effective amount of driving surface 260 of the slot 254 which will engage the driven surface 262 of the cutter. This driven surface, indicated by the dimension 264 should be sufficient to prevent extreme tilting of the cutter 222.

Briefly reviewing the operation of the embodiment of Figure 1, waste material is placed into the opening 18 of the disposer 10 and passes down into the grinding zone 20. The grinder includes a stationary element in the form of a shredder ring 72 and a movable element in the form of cutting lugs 76 and 78. The cutting lugs are shown supported on spring leaves 116 and 118 secured on a power driven flywheel or rotor 110. As the flywheel rotates, the waste material is cut between the shredding ring 72 and the cutting lugs 76 and 78, and passes downwardly with the flushing water into the channel 22. Unusually hard objects will not stall the rotor inasmuch as the cutting lugs are free to deflect downwardly into the slots 122 and 124 in which they are located on the rotor.

In the forms of Figures 5 and 6, the springs 180 and 206, which support the cutting lugs 170 and 196 normally hold the lugs down into their slots 174 and 198, but centrifugal force due to the rotation of the flywheels, will urge the cutting lugs upwardly out of their slots dependent on the speed of the flywheel. As the speed slows down, the lugs retract into their slots to decrease their effective cutting surface.

In the forms of Figures 7 and 8, the leading cutting surface of the cutting lugs 220 and 222 is tapered rearwardly so as to provide a vertical component of reactive force which urges the lugs down into their slots 226 and 254 in proportion to the grinding resistance encountered. This automatically controls the effective cutting area and cutting characteristic of the cutting lugs.

It should be noted that in all of the embodiments shown and described herein, the structure is such that when an obstruction is encountered by the rotatable grinding element, which obstruction might normally tend to stall or jam the disposer unit, the movable grinding element will retract so as to present a rotor having a substantially unobstructed top surface, thereby allowing the waste material to be redistributed.

It will be understood that the embodiments are shown separately for clarity but all features contribute to obtaining an improved grinder and can be selectively incorporated into a single grinder.

Thus, it will be seen that I have provided an improved food waste disposer and an improved grinder for the disposer which meet the objectives and advantages hereinbefore set forth. The grinder improves the grinding function and thereby enhances the overall performance of the disposer. The grinder is capable of increased capacity and will not stall under heavy loads, but will maintain its cutting efficiency.

I have, in the drawings and specification, presented a detailed disclosure of the preferred embodiments of my invention, but it is to be understood that I do not intend to limit the invention to the specific form disclosed, but intend to cover all modifications, changes and alternative constructions and methods falling within the principles taught by my invention.

I claim as my invention:

1. A power drive food waste grinder and disposer comprising a housing for the grinder provided with a waste receiving opening and a discharge opening, a rotor member in said housing between the waste receiving and discharge openings, a grinding means within the housing including a stationary grinding member with a grinding element and a coacting movable grinding member with a grinding element, said elements defining a grinding space therebetween through which the ground material passes, one of said grinding elements relatively movable in a direction parallel to said grinding space between a full grinding position wherein waste particles will be reduced in size and a reduced grinding position wherein the elements will be less effective to reduce the waste particles, a laterally inflexible and vertically resilient strip member connected adjacent one end to the movable cutting element and adjacent its opposite end to the rotor member to restrain said element against lateral movement relative to the rotor while permitting vertically upward flexing under high speed rotation of the rotor and vertical downward movement when the movable grinding element and stationary grinding element encounter waste material of substantial size or resistance to grinding, and power means connected to drive the movable grinding member.

2. A food waste disposer comprising in combination a housing defining a grinding zone therein and having an opening for passing waste material to the grinding zone, fixed grinding members supported on the housing in the grinding zone, a rotor located in the grinding zone, a cutter mounted on the rotor, said rotor having a slot therein in which the cutter is positioned, said slot extending radially with respect to the rotor, a radially extending support member having lateral inflexibility and vertical resiliency for mounting said cutter on said rotor and permitting vertical movement of the cutter out of said slot due to centrifugal force on said cutter while limiting lateral movement with respect to said rotor, a first radially extending wall in the slot on the driving side thereof and in driving engagement with the cutter, and a second opposing wall in the slot, said cutter wall and slot being spaced for the improved flushing of chips and ground waste material.

3. A disposer for food waste comprising a disposer casing for housing grinding elements and having an opening for receiving large waste particles to pass to a grinding zone therein, a stationary cutter having grinding elements and located in the grinding zone, a rotary cutter having a grinding element located within the grinding zone to coact with the stationary cutter, said grinding elements relatively movable between a first full grinding position and a second position when the effective grinding is changed, power means for driving the rotary cutter, and leaf spring means responsive to the speed of the rotary cutter and operatively connected to the rotary one of the grinding elements to limit lateral movement thereof relative to the rotary cutter while permitting said rotary one of the grinding elements to move parallel and generally vertical to the cutting face of the stationary grinding element between the first and second positions to vary the effective grinding with speed variation.

4. A disposer for food waste comprising a disposer casing for housing grinding elements and having an opening for receiving large waste particles to pass to a grinding zone, a stationary cutter having a grinding element and located in the grinding zone, a rotary grinding member having a slot with a cutter mounted therein and movable relative to the slot in a direction substantially parallel to the rotational axis of the rotary grinding member, means for driving the rotary grinding member, and leaf spring means attached at one end to the rotary grinding member and supporting the cutter at its opposite end, the cutter being seated in the slot during relatively low speed rotation of the grinding member and raising upwardly therefrom during high speed rotation while being laterally essentially immovable relative to the rotary grinding member regardless of the rotative speed of said grinding member.

5. A disposer for food waste comprising a disposer casing for housing grinding elements and having an opening for receiving large waste particles to pass to a grinding zone therein, a stationary cutter having a grinding element and located in the grinding zone, a rotary grinding member having a slot with a cutter mounted therein and movable relative to the slot, a radially extending support member having lateral inflexibility and vertical resiliency for carrying the cutter on the rotary grinding member and permitting vertical movement of the cutter out of the slot due to centrifugal force on the cutter while limiting lateral movement with respect to the grinding member, and power means for driving the grinding member.

6. A disposer for food waste comprising a disposer casing for housing grinding elements and having an opening for receiving large waste particles to pass to a grinding zone therein, a stationary cutter having a grinding element and located in the grinding zone, a rotary grinding member having a slot with a cutter mounted therein and movable vertically relative to the slot and relative to the axis of rotation of the grinding member, a spring leaf mounted on the rotary member along the upper surface thereof and secured to the cutter at a location on the cutter whereby centrifugal force will move the cutter out of the slot into a position generally radially inwardly of the stationary grinding element, said spring leaf limiting lateral movement of the cutter and permitting substantial vertical movement of said cutter so that the grinder member continues to operate when the waste particles are of substantial size or toughness, and power means for driving the grinding member.

7. A disposer for food waste comprising a disposer casing for housing grinding elements and having an opening for receiving large waste particles to pass to a grinding zone therein, a stationary cutter member having a grinding element and located in the grinding zone, a rotary grinding member having a slot, a cutter located in said slot, a radially extending support member having lateral inflexibility and vertical resiliency for mounting said cutter on said rotary grinding member and permitting vertical movement of the cutter out of said slot due to centrifugal force on said cutter while limiting lateral movement with respect to said rotary grinding member, means for driving the rotary grinding member, and a stop means limiting the movement of the cutter out of the slot whereby adequate support will be insured.

8. A disposer for food waste comprising a housing for grinding elements having an insert opening for receiving waste particles and a discharge opening for ground materials, an annular fixed grinding member mounted by the housing interior and defining a grinding zone therein, a movable wedge-shaped grinding member having lateral radially extending surfaces, a rotor having a radially extending slot with radial side surfaces lying in a radial axial plane relative to the axis of rotation of the rotor, means for driving the rotor in rotation, and relatively flat spring means for supporting the movable grinding member relatively fixed against lateral movement with respect to the rotor and with the lateral surfaces in sliding axial relationship to said radial side surfaces of the rotor slot to permit vertical movement of the movable grinding member relative to the rotor when said grinding member encounters waste particles difficult to grind.

9. A disposer for food waste comprising a disposer casing for housing grinding elements and having an opening for receiving large waste particles to pass to a grinding zone therein, a stationary cutter having a grinding element and located in the grinding zone, a cutter mounted to be driven in rotation, a rotor having a slot for receiving the cutter, a radially extending support member having lateral inflexibility and vertical resiliency for mounting said cutter on said rotor and permitting vertical movement of the cutter out of said slot due to centrifugal force on said cutter while limiting lateral movement with respect to said rotor, and a cutter controlling face lying in a radial plane tilted rearwardly with respect to the direction of rotation about a radial line, said face creating a reaction force with the material being ground urging the cutter to reduced cutting position.

10. A disposer for food waste comprising a disposer casing for housing grinding elements and having an opening for receiving large waste particles to pass to a grinding zone therein, a stationary cutter having a grinding element and located in the grinding zone, a cutter mounted to be driven in rotation, a rotor having a slot for receiving the cutter, a radially extending support having lateral inflexibility and vertical resiliency for carrying the cutter on the rotor and permitting vertical movement of the cutter out of said slot due to centrifugal force on said cutter while limiting lateral movement with respect to said rotor, a radial leading upper slanting surface on the cutter creating a downward component of force urging the cutter to move on its radial support to the second position with a force dependent upon the resistance of the material being ground, and power means for driving the grinding member.

11. A disposer for food waste comprising a disposer casing for housing grinding elements and having an opening for receiving large waste particles to pass to a grinding zone therein, a stationary cutter having a grinding element and located in the grinding zone, a rotary grinding member provided with a slot and having a driving surface extending in a radial plane, a cutter mounted in said slot on the grinding member and having a coacting radial driven surface facing said driving surface, a radially extending support member having lateral inflexibility and vertical resiliency for mounting said cutter on said rotary grinding member and permitting vertical movement of the cutter out of said slot due to centrifugal force on said cutter while limiting lateral movement with respect to said rotary grinding member, and means for driving the rotary grinding member.

12. A food waste disposer including a power driven grinder comprising a housing for the disposer, a grinder within the housing including a stationary grinding member having annularly disposed grinding elements, a rotatable circular grinding member having radial slots therein, movable grinding elements carried by the rotatable grinding member and located within the elements of said stationary member, radially extending spring leaves secured to the rotatable grinding member and to the movable grinding elements for free axial movement of the grinding elements into the slots upon encountering a waste particle of unusual resistance, power means for driving the rotatable member, and a resilient stop carried by each grinding element on the movable grinding member and contacting said member when the elements move vertically downwardly to the base of the slot to reduce the noise of impact therebetween.

13. A power driven food waste disposer, comprising a housing provided with waste receiving and waste discharge openings, a grinding assembly in said housing between said openings and comprising movable grinding means and immovable grinding means surrounding the movable grinding means and defining an annular grinding space therewith, rotor means in the housing and supported thereby for rotating the movable grinding means relative to the immovable grinding means, and leaf spring means attached adjacent one end to the rotor means and secured adjacent the opposite end to the movable grinding means, the latter means being thereby limited in lateral movement relative to the rotor means so that the grinding space remains continuously open for passage of waste particles therethrough and being thereby vertically movable with respect to the immovable grinding means and rotor means to accommodate waste particles of substantial size or resistance to grinding without stoppage or substantial reductions in the rotative speed of the rotor means.

14. A power driven food waste disposer, comprising a housing provided with waste receiving and waste discharge openings, a grinding assembly in said housing between said openings and comprising movable grinding means and stationary grinding means surrounding the movable grinding means and defining an annular grinding space therewith, a flywheel in the housing and supported thereby for rotating the movable grinding means relative to the stationary grinding means, and resilient strip means attached adjacent one end to the flywheel and adjacent the opposite end to the movable grinding means to support the latter means generally flush with the upper surface of the flywheel during relatively slow speed rotation of said flywheel, the strip means supporting the movable grinding means against lateral movement relative to the flywheel regardless of the speed of flywheel rotation and permitting said movable grinding means to move vertically upwardly with respect to the stationary grinding means during relative high speed flywheel rotation and vertically downwardly when waste particles of substantial size or resistance to grinding are encountered to prevent substantial speed reduction in the flywheel.

15. A power driven food waste disposer, comprising a housing provided with waste receiving and waste discharge openings, a grinding assembly in said housing between said openings and comprising an annular fixed grinding member attached to the housing inner diameter and provided with a plurality of vertically spaced rows of grinding surfaces extending radially inwardly toward the central vertical axis of the housing, a plurality of movable grinding elements radially inwardly spaced from the fixed grinding member, a rotor element in the housing and means for driving the same to rotate the grinding elements relative to the fixed grinding surfaces, and leaf spring means supporting each grinding element radially spaced from the fixed grinding member, said spring means being attached adjacent one end of the upper surface of the rotor element and adjacent its opposite end to a grinding element to limit said element against movement in a horizontal plane relative to the rotor element, said spring means being free to flex vertically about its attachment to the rotor element to permit the grinding element carried thereon to rise during high speed rotation of the rotor element and to permit the grinding element to lower itself when said element encounters waste particles of substantial size or resistance to grinding.

16. A power driven food waste disposer, comprising a housing provided with waste receiving and waste discharge openings, a grinding assembly in said housing between said openings and comprising an annular fixed grinding member attached to the housing inner diameter and provided with a plurality of vertically spaced rows of grinding surfaces extending radially inwardly toward the central vertical axis of the housing, a plurality of movable grinding elements radially inwardly spaced from the fixed grinding member, a rotor element in the housing and having radial slots formed therein receiving the grinding elements during relatively low speed rotation of the rotor element, drive means connected to the rotor element to rotate the same and the grinding elements carried by the rotor element, and leaf spring means supporting each grinding element radially spaced from the fixed grinding member, said spring means being attached adjacent one end of the upper surface of the rotor element and adjacent its opposite end to a grinding element to limit said element against movement in a horizontal plane relative to the rotor element, said spring means being free to flex vertically about its attachment to the rotor element to permit the grinding element carried thereon to rise vertically upwardly from the radial slot during high speed rotation of the rotor element and to permit the grinding element to lower itself toward the radial slot to be at least partially received therein when said element encounters waste particles of substantial size or resistance to grinding.

17. A power driven food waste disposer, comprising a housing provided with waste receiving and waste discharge openings, a grinding assembly in said housing between said openings and comprising an annular fixed grinding member attached to the housing inner diameter and provided with a pair of vertically stacked rows of grinding surfaces extending radially inwardly from the fixed grinding member, a plurality of movable grinding elements positioned beneath one row of fixed grinding surfaces to define a first grinding zone therewith and being positioned radially inwardly from the other row of grinding surfaces to define a second grinding zone therewith, a rotor element in the housing for rotating the movable grinding elements and carrying grinding teeth thereon to define with the other row of grinding surfaces a third grinding zone, and essentially flat resilient means connecting with the grinding elements and rotor elements to restrain the grinding elements against movement in a horizontal plane relative to the rotor element and resiliently mount the grinding elements for movement in a vertical plane whereby during high speed rotation of the rotor element the grinding elements raise upwardly toward the one row of fixed grinding surfaces and flex downwardly toward the third grinding zone when waste particles of substantial size or resistance to grinding are encountered.

18. A power driven food waste disposer, comprising a housing provided with waste receiving and waste discharge openings, stationary grinding means within the housing between said waste receiving and discharge openings, rotor means in the housing supported for rotation therein, leaf spring means attached adjacent one end to the rotor means, and movable grinding means secured adjacent the opposite end of the leaf spring means, the movable grinding means being thereby restrained against horizontal and radial outward movement relative to the rotor means during both slow and high speed rotation of the rotor means, said movable grinding means bottoming on the rotor means when waste particles difficult to grind are encountered and raising upwardly from the rotor means during relatively high speed rotation of the rotor means to dispose the movable grinding means generally on a horizontal line with and radially inwardly of the stationary grinding means in cutting cooperation therewith.

References Cited in the file of this patent

UNITED STATES PATENTS

| | | |
|---|---|---|
| 2,220,729 | Powers | Nov. 5, 1940 |
| 2,482,125 | Powers | Sept. 20, 1949 |
| 2,519,198 | Richeson | Aug. 15, 1950 |
| 2,566,069 | Powers | Aug. 28, 1951 |
| 2,643,066 | Lamb | June 23, 1953 |
| 2,749,053 | Rieth | June 5, 1956 |
| 2,853,248 | Long | Sept. 23, 1958 |